United States Patent
Landers et al.

(10) Patent No.: US 8,682,610 B2
(45) Date of Patent: Mar. 25, 2014

(54) PHYSICAL SENSOR DEVICES HAVING A MULTI-REFERENCE VECTOR SYSTEM

(75) Inventors: Stephen P. Landers, Portsmouth, OH (US); Paul W. Yost, Portsmouth, OH (US)

(73) Assignee: YEI Corporation, Portsmouth ( * ) Notice: Subject to any disclaimer, the term of this patent is extended or adjusted under 35 U.S.C. 154(b) by 85 days.

(21) Appl. No.: 13/408,376

(22) Filed: Feb. 29, 2012

(65) Prior Publication Data

US 2012/0197590 A1 Aug. 2, 2012

Related U.S. Application Data

(63) Continuation of application No. PCT/US2012/023087, filed on Jan. 30, 2012.

(60) Provisional application No. 61/437,919, filed on Jan. 31, 2011.

(51) Int. Cl.
*G06F 15/00* (2006.01)

(52) U.S. Cl.
USPC .............................. 702/150; 702/85; 702/93

(58) Field of Classification Search
USPC ......... 702/85, 93, 94, 95, 104, 141, 150, 151, 702/153; 73/510; 89/41.19; 345/419; 701/510
See application file for complete search history.

(56) References Cited

U.S. PATENT DOCUMENTS

| | | | |
|---|---|---|---|
| 5,245,909 A | 9/1993 | Corrigan et al. | |
| 5,850,624 A | 12/1998 | Gard et al. | |
| 6,810,738 B2 | 11/2004 | Sakaguchi | |
| 7,143,004 B2 | 11/2006 | Townsend et al. | |
| 7,433,798 B2 | 10/2008 | Townsend et al. | |
| 7,587,277 B1 | 9/2009 | Wells | |
| 7,979,231 B2 | 7/2011 | Eckert | |
| 8,010,308 B1 | 8/2011 | Churchill | |
| 2010/0114517 A1 | 5/2010 | Boeve et al. | |
| 2010/0250177 A1* | 9/2010 | Van Acht et al. | 702/93 |

OTHER PUBLICATIONS

PCT International Search Report and Written Opinion of the International Searching Authority, PCT/US2012/023087, filed Jan. 30, 2012.

* cited by examiner

*Primary Examiner* — John H Le
(74) *Attorney, Agent, or Firm* — Dinsmore & Shohl LLP (57) ABSTRACT

Physical sensor devices, methods, and computer useable mediums for estimating an orientation of a physical sensor device are disclosed. According to one embodiment, a method for estimating an orientation of a physical sensor device includes determining a sensed vector associated with a physical sensor and comparing the at least one sensed vector to at least a portion of a plurality of check vectors. Each check vector corresponds to an orientation of the physical sensor device. A reference vector is associated with each check vector, thereby defining a plurality of reference vectors. The method further includes selecting at least one check vector that is closest to the at least one sensed vector, selecting a selected at least one reference vector associated with the selected at least one check vector, and estimating the orientation of the physical sensor device based at least in part on the selected at least one reference vector.

18 Claims, 7 Drawing Sheets

PHYSICAL SENSOR DEVICES HAVING A MULTI-REFERENCE VECTOR SYSTEM

CROSS REFERENCE TO RELATED APPLICATIONS

This application is a continuation of U.S. PCT Patent Application No. PCT/US2012/023087 filed Jan. 30, 2012 and claims the benefit of U.S. Provisional Patent Application Ser. No. 61/437,919, filed Jan. 31, 2011, the entire disclosures of which are hereby incorporated herein by reference.

TECHNICAL FIELD

The present application relates generally to physical sensor device and, more particularly, the physical sensor devices using a multi-reference vector system for orientation estimation.

SUMMARY

Inertial measurement units (IMUs) use sets of sensors which measure physical quantities to estimate orientation. These units commonly include vector valued sensors such as accelerometers or magnetometers. These sensors can be used to determine along which body frame vector (vector relative to the IMU, such as a vector pointing directly out of the top of the IMU, or one pointing directly out of the right side) a certain vector which represents a physical quantity (such as gravity or North) lies. Inertial measurement units which use this type of sensor often have a reference vector for each such sensor to act as a zero point for that sensor. Two of these sensors which sense non-parallel physical vectors and both have reference vectors provide enough information to calculate the complete orientation of the IMU. When the sensed vectors and reference vectors match, the estimated orientation is the zero orientation of the unit. An illustration of how reference vectors are used may be found in FIGS. 1A-1D. These figures only show a single sensed and reference vector pair for simplicity. The dotted arrows are sensed vectors, while the solid arrows are reference vectors.

Figure 1A:
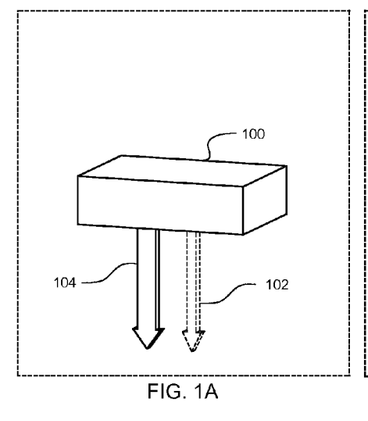
FIG. 1A schematically depicts a physical sensor device having a sensed vector and a reference vector, wherein the physical sensor device is positioned in a reference orientation.
Figure 1B:
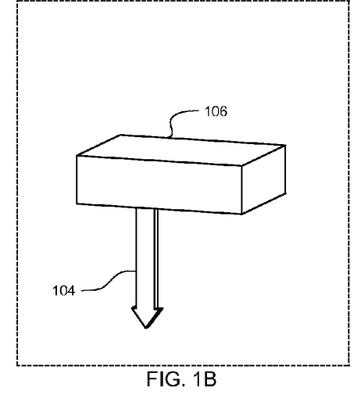
FIG. 1B schematically depicts the physical sensor device in the reference orientation as depicted in FIG. 1A, further illustrating that the physical sensor device is in the reference orientation.

As illustrated in FIG. 1A, a physical sensor 100 is positioned in the zero orientation, wherein the physical sensor 100 produces a sensed vector 102. Depending on the configuration of the physical sensor 100, the sensed vector may be North if the physical sensor 100 is configured as a magnetometer, or the direction of gravity if the physical sensor 100 is configured as an accelerometer. In this orientation, the sensed vector 102 matches a reference vector 104 that is associated with physical sensor 100. The reference vector 104 may have been previously recorded during a calibration process. Because the sensed vector 102 and the reference vector 104 match in FIG. 1A, the calculated orientation 106 for the physical sensor is the zero orientation, as indicated in FIG. 1B.

Figure 1C:
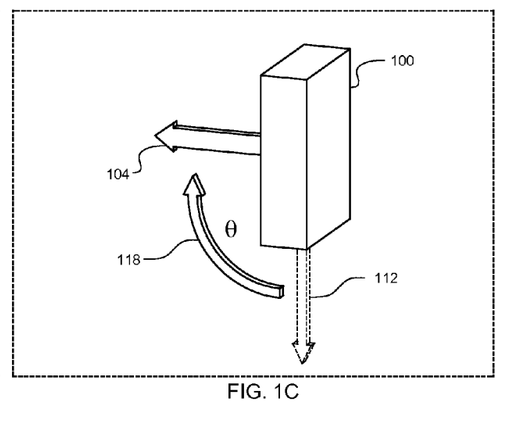
FIG. 1C schematically depicts a physical sensor device having a sensed vector and a reference vector, wherein the physical sensor device is positioned in a non-reference orientation.
Figure 1D:
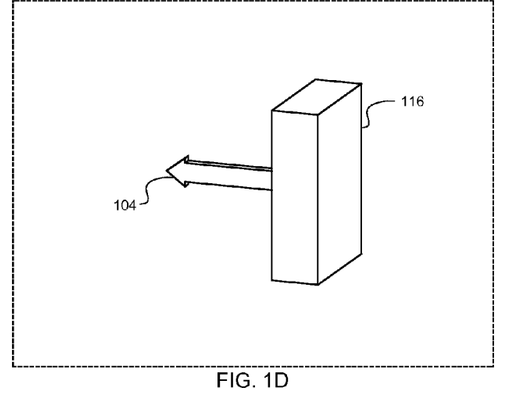
FIG. 1D schematically depicts the physical sensor device in the non-reference orientation as depicted in FIG. 1C, wherein the sensed vector as been rotated to be aligned with the reference vector.

Referring now to FIG. 1C, the physical sensor 100 is illustrated as being in a non-zero orientation, such that sensed vector 112 is not aligned with the reference vector 104. FIG. 1D depicts a final calculated orientation 116 for the physical sensor, which is arrived at by the identity orientation undergoing the rotation defined by angle 118. Note that the reference vector 104 does not change from the point of view of the sensor, meaning that as the sensor moves, the reference vector 104 will move with it. While this reference vector 104 may provide an accurate orientation estimate for the zero orientation, it may not provide as much accuracy for other orientations, due to sensor error and illinearity. Accuracy may be diminished the farther the orientations of the physical sensor get from the zero orientation.

Embodiments of the present disclosure proposes a scheme in which the reference vector for each sensor is selected from a set of stored reference vectors in order to provide accurate orientation results for more orientations. According to one embodiment, a method of estimating an orientation of a physical sensor device includes determining at least one sensed vector associated with at least one physical sensor and comparing the at least one sensed vector to at least a portion of a plurality of check vectors. Each check vector of the plurality of check vectors corresponds to an orientation of the physical sensor device. Additionally, a reference vector is associated with each check vector, thereby defining a plurality of reference vectors. The method further includes selecting at least one check vector that is closest to the at least one sensed vector, selecting a selected at least one reference vector associated with the selected at least one check vector, and estimating the orientation of the physical sensor device based at least in part on the selected at least one reference vector.

According to another embodiment, a physical sensor device includes a first and second physical sensor configured to provide a first and second sensed vector, respectively, corresponding to an orientation of the physical sensor device, a controller operable to receive the first and second sensed vectors, and a computer useable medium storing a reference vector table having a plurality of check vector pairs and a corresponding plurality of reference vector pairs, and computer readable code. The computer readable code, when executed by the controller, causes the controller to receive a sensed vector pair including the first sensed vector and the second sensed vector, and to compare the sensed vector pair to at least a portion of the plurality of check vector pairs. Each check vector pair corresponds to an orientation of the physical sensor device, and each check vector pair is associated with a reference vector pair. The computer readable code further causes the controller to select at least one check vector pair that is closest to the sensed vector pair, to determine a final reference vector based at least in part on at least one reference vector pair associated with the at least one check vector pair, and to estimate the orientation of the physical sensor device based at least in part on the final reference vector.

According to yet another embodiment, a computer useable medium includes computer readable code for estimating an orientation of a physical sensor device. The computer readable code includes computer readable code instructions configured to cause a controller to effect the determining of at least one sensed vector associated with at least one physical sensor, and computer readable code instructions configured to cause the controller to effect the comparing of the at least one sensed vector to at least a portion of a plurality of check vectors. Each check vector of the plurality of check vectors corresponds to an orientation of the physical sensor device. Additionally, a reference vector is associated with each check vector, thereby defining a plurality of reference vectors. The computer readable code further includes computer readable code instructions configured to cause the controller to effect the selecting of at least one check vector that is closest to the at least one sensed vector, computer readable code instructions configured to cause the controller to effect the selecting of a selected at least one reference vector associated with the selected at least one check vector, and computer readable code instructions configured to cause the controller to effect the estimating the orientation of the physical sensor device based at least in part on the selected at least one reference vector.

BRIEF DESCRIPTION OF THE DRAWINGS

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate various embodiments described herein, and together with the description serve to explain the principles and operations of the claimed subject matter.

DETAILED DESCRIPTION

Embodiments of the present disclosure are directed to physical sensor devices, such as initial measurement unit devices, comprising a multi-reference vector system in which a reference vector for each sensor of the physical sensor device is selected from a set of stored reference vectors in order to provide accurate orientation results for a plurality of orientations. A multi-reference vector system may provide increased accuracy over a single-reference vector system.

Figure 2:
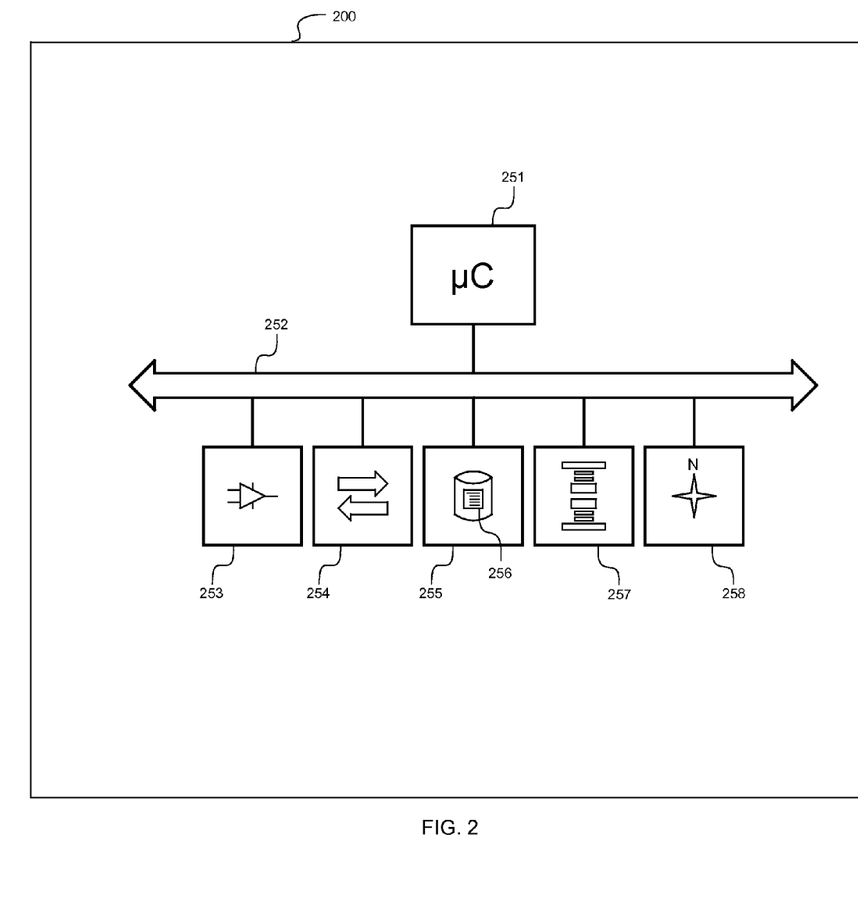
FIG. 2 schematically depicts exemplary internal components of an exemplary physical sensor device according to one or more embodiments described and illustrated herein.
Figure 3A:
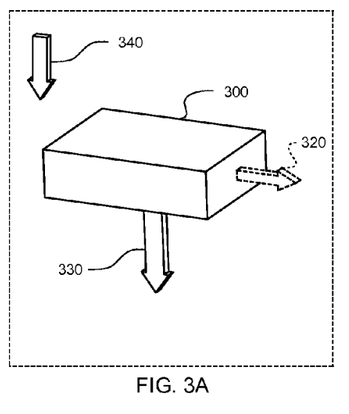
FIGS. 3A-3F schematically depict a physical sensor device in a plurality of exemplary reference orientations during a calibration process according to one or more embodiments described and illustrated herein.
Figure 3B:
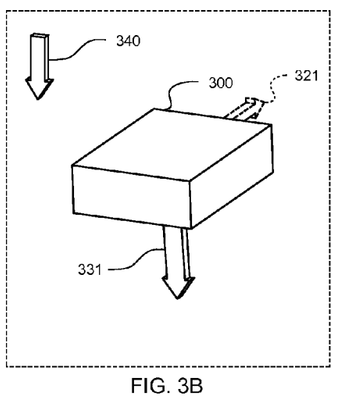
Figure 3C:
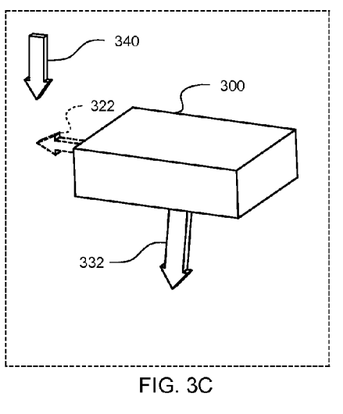
Figure 3D:
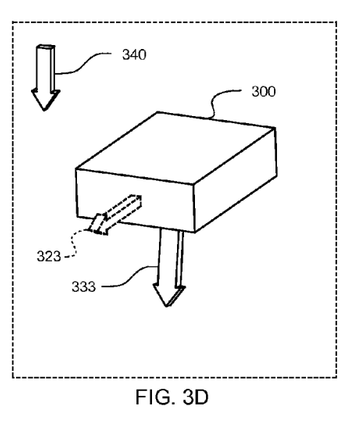
Figure 3E:
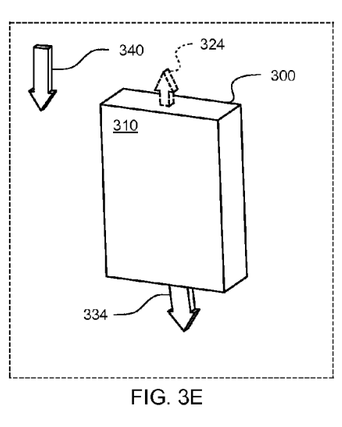
Figure 3F:
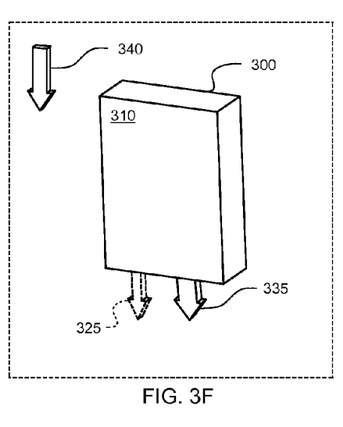

Referring now to FIG. 2, internal components of an exemplary physical sensor device 10, such as an initial measurement unit device, is schematically illustrated. More particularly, FIG. 2 depicts a physical sensor device 200 for estimating an orientation of the physical sensor device 200 (and/or the orientation of an object or device incorporating the physical sensor device 200) embodied as hardware, software, and/or firmware, according to embodiments shown and described herein. It is noted that computer-program products and methods for estimating an orientation of the physical sensor device 200 may be executed by any combination of hardware, software, and/or firmware.

The physical sensor device 200 illustrated in FIG. 2 comprises a controller 11, additional controller hardware 253, input/output hardware 254, a non-transitory computer useable medium 254 (which may store computer readable code 256 for performing the various operations for orientation estimations, for example), a first physical sensor 257, and a second physical sensor 258. In the illustrated embodiment, the first physical sensor 257 is an accelerometer and the second physical sensor 258 is a magnetometer or compass. More or fewer physical sensors may be utilized. It should be understood that the components illustrated in FIG. 2 are merely exemplary and are not intended to limit the scope of this disclosure.

The computer useable medium 255 may be configured as volatile and/or nonvolatile computer readable medium and, as such, may include random access memory (including SRAM, DRAM, and/or other types of random access memory), flash memory, registers, compact discs (CD), digital versatile discs (DVD), magnetic disks, and/or other types of storage components. Additionally, the computer useable medium 255 may be configured to store, among other things, computer readable code 256 for orientation estimation, as described in more detail below. It should be understood that the computer useable medium 255 may also store one or more pieces of data (e.g., reference vector table(s), as described in detail below) for access by the controller 251 and/or additional controller hardware 253. A local interface 252 is also included in the embodiment of FIG. 2, and may be implemented as a bus or other interface to facilitate communication among the components of the physical sensor device 10.

The controller 251 may include any processing component configured to receive and execute instructions (such as from the computer useable medium 255). It is noted that the orientation methods described herein may be effectuated by the controller as software instructions stored on the computer useable medium 255, as well as by additional controller hardware 253. In some embodiments, the additional controller hardware 253 may comprise logic gates to perform the software instructions as a hardware implementation. The controller 251 may be configured as, but not limited to, a general purpose microcontroller, an application-specific integrated circuit, or a programmable logic controller.

The physical sensor device 200 may be incorporated into larger systems, and may be able to communicate with external devices and components of such systems via input/output hardware 254. The input/output hardware 254 may include any hardware and/or software for sending and receiving data, such as an output signal corresponding to an orientation estimation of the physical sensor device 10. Exemplary input/output hardware 254 includes, but is not limited to, universal serial bus (USB), FireWire, Thunderbolt, local area network (LAN) port, wireless fidelity (Wi-Fi) card, WiMax card, and/or other hardware for communicating with other networks and/or external devices.

As described in more detail below, the first and second physical sensors 257, 258 may be configured to provide a signal to the controller 251 (or other components of the physical sensor device 200) as a sensed vector that corresponds with a physical orientation of the physical sensor device 10. The signal or data from the first and/or second physical sensors 257, 258 may be provided to the controller 251 and/or additional controller hardware 253 over the local interface 252. The accelerometer may be configured to provide a sensed vector that corresponds to its orientation relative to gravity, while the magnetometer may be configured to provide a sensed vector that corresponds to its orientation relative to magnetic North. The accelerometer and the magnetometer may be configured as any proprietary, currently available, or yet-to-be-developed sensor. It should be understood that the physical sensor device 200 may have any combination of accelerometers and magnetometers (or other sensors that output a sensed vector corresponding to orientation).

As described in detail below, embodiments of the present disclosure create and utilize a multi-reference vector system for accurately generating an estimation as to the orientation of the physical sensor device and/or the larger component or system in which the physical sensor device is incorporated. Multiple reference vectors may be generated and stored as a reference vector set within a reference vector table. During operation, the physical sensor device may compare one or more sensed vectors provided by the sensor devices with a plurality of check vectors to determine which check vectors are closest to the one or more sensed vectors. The reference vectors associated with the check vectors that are closest to the one or more sensed vectors may then be selected and used in the calculation of a final, composite reference vector. The composite reference vector may then be outputted from the physical sensor device 200 (e.g., via the input/output hardware 254). Various embodiments of the generation and use of the reference vector set are described in detail below.

The reference vector set may be generated by a calibration process. Generally, according to some embodiments, a reference vector is calculated for each of a plurality of reference orientations in which the physical sensor device 100 is placed. Before the calibration process begins, one or more physical sensors (e.g., the accelerometer 257 and/or the magnetometer 258) provided within the physical sensor device 100 are given a base reference vector from which to calculate other reference vectors. This base reference vector will often start in the direction of gravity for an accelerometer 257, or magnetic North for a compass/magnetometer 258, for a particular orientation of the physical sensor. In other words, the sensed vector for one particular orientation of the physical sensor can be used as the base reference vector. As with all reference vectors, the base reference vector does not change from the physical sensor's point of view, and so will not always point at the physical quantity as the physical sensor device 100 is moved around.

FIGS. 3A-3F illustrate an exemplary calibration process according to one or more embodiments. FIGS. 3A-3F depict an alignment of physical sensor device 300 (or just an individual physical sensor, such as a magnetometer 258 or an accelerometer 257) with each of six predetermined reference orientation vectors 320-325. It is noted that embodiments of the physical sensor device may comprise more than one physical sensor, as depicted in FIG. 2, and that only one sensed vector is depicted and described for ease of illustration.

The reference orientation vectors 320-325 correspond to plurality of reference orientations. As the physical sensor device 300 is aligned with each of the six reference orientation vectors 320-325, a respective sensed vector 330-335 is read from the physical sensor associated with the physical sensor device 300. In other words, a sensed vector 330-335 is read for each reference orientation. Each sensed vector 320-325 that is read may be stored within the physical sensor device 300, such as in the computer useable medium 255. It should be understood that embodiments are not limited to six reference orientation vectors 320-325, as more or fewer may be utilized.

As illustrated in FIGS. 3A-3F, the sensed vectors 330-335 are all similar in direction to a physical quantity vector 340, but deviate from the physical quantity vector 340 by small amounts due to physical sensor error. The physical quantity vector 340 represents the physical quantity that the one or more physical sensors within the physical sensor device 300 are measuring. For an accelerometer 257, the physical quantity vector 340 points to the direction of the Earth's gravity. For a magnetometer 258, the physical quantity vector 340 points to magnetic North. The physical sensor error may result from a variety of sources, including, but not limited to, internal sensor error, illinearity, electromagnetic interference, and the like.

Once a sensed vector 330-335 has been read and stored for a particular reference orientation, a reference vector may be calculated for each sensed vector 330-335 (or a subset of the sensed vectors 330-335) based on the physical sensor error. It is noted that the reference vector may be calculated after each sensed vector is read and recorded, or all of the reference vectors may be calculated at the end of the calibration process.

Figure 4:
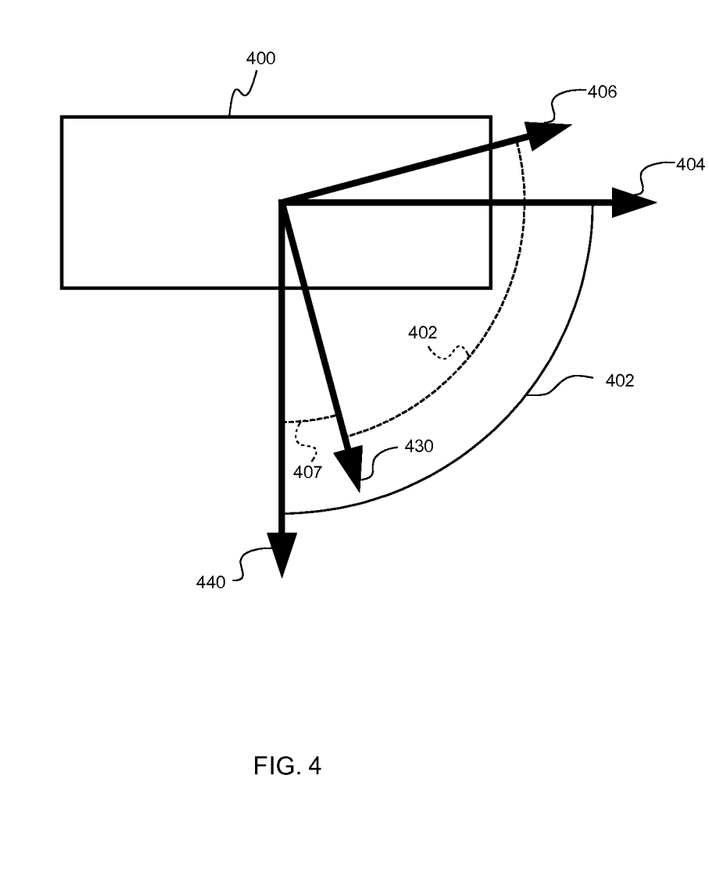
FIG. 4 schematically depicts a calibration process of calculating a reference vector according to one or more embodiments described and illustrated herein.

An exemplary reference vector calculation process according to one embodiment is schematically illustrated in FIG. 4. The physical sensor device 400 has been positioned in a particular reference orientation that is defined by angle 402, which is the angle from the physical quantity 440 to the base reference vector 404 of the first and second physical sensors 257, 258. In this reference orientation, the sensed vector 430 is read and stored as a check vector. Check vectors are described in more detail below.

As depicted in FIG. 4, there is an error angle 407 between the sensed vector 430 and the actual physical quantity 440 that the sensed vector 430 is measuring. A calculated reference vector 406 is derived from the sensed vector 430 by rotating sensed vector 405 by angle 402. Calculated reference vector 406 is then stored for later use by the physical sensor device, along with the sensed vector that was used to calculate it. As stated above, the stored sensed vector 430 is called a check vector, as it will be checked against other sensed vectors later during operation of the physical sensor device. The plurality of reference vectors and corresponding plurality of check vectors may be stored as a reference vector table in the computer useable medium. As described above, a physical sensor device comprising embodiments of the multi-reference vector system may be based on device in which two vector valued sensors (e.g., an accelerometer 257 and/or an magnetometer 258) are available, leading to a reference vector table containing pairs of reference vectors (i.e., a first reference vector and a second reference vector) and pairs of check vectors (i.e., a first check vector and a second check vector). Reference vector pairs may be switched dynamically based on which set(s) of check vectors is closest to the sensed vectors.

Figure 5A:
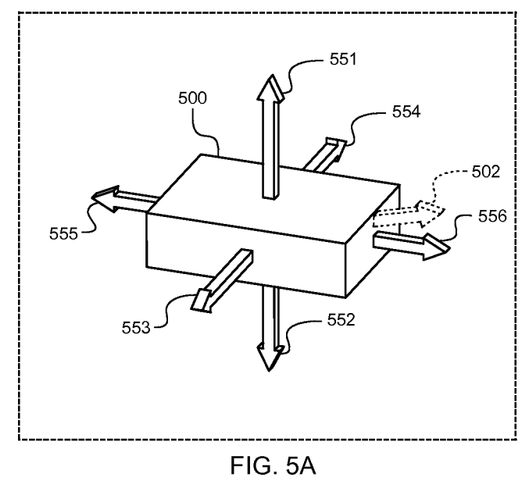
FIG. 5A schematically depicts a sensed vector of a physical sensor device being compared with a plurality of check vectors according to one or more embodiments described and illustrated herein.

FIG. 5A provides a schematic illustration of a physical sensor device 500 having been calibrated in six different reference orientations. The physical sensor device 500 is illustrated generating a sensed vector 504 using one of the internal physical sensors 257, 258. The sensed vector 504 is being compared with check vectors 551-556 that resulted from a six reference orientation calibration procedure wherein sensed vectors were stored as the check vectors 551-556. As described above, each check vector 551-556 has a calculated reference vector associated therewith. It is noted that only single check vectors, and not check vector pairs resulting from two physical sensors, are illustrated for ease of illustration and description. It is also noted that the check vectors 551-556 are displayed from the physical sensor's point of view, as from an external point of view all check vectors 551-556 point in the same direction, just as the sensed vectors illustrated in FIG. 3.

Figure 5B:
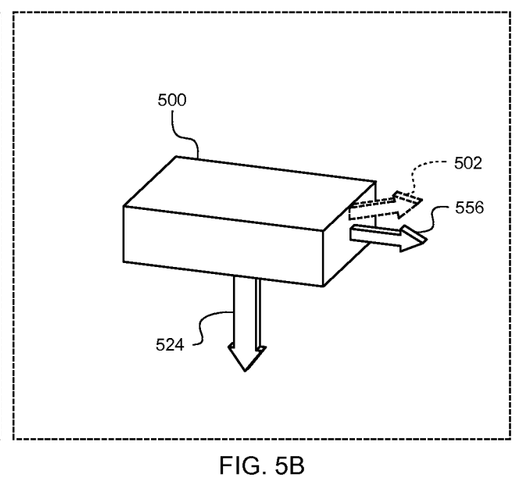
FIG. 5B schematically depicts a reference vector associated with a check vector that is closest to the sensed vector depicted in FIG. 5A according to one or more embodiments described and illustrated herein.

Referring now to FIG. 5B, check vector 556 been selected from among the plurality of check vectors 551-556, as it is closest to the sensed vector 502. Reference vector 524, which is the reference vector that associated with check vector 556, is then selected to be used as one of the reference vectors in the calculation of a composite reference vector that will be used to estimate the orientation of the physical sensor device 500. It is noted that while check vectors 551-556 point in all directions, all reference vectors for a single physical sensor within the physical sensor device will point in roughly the same direction. In one embodiment, all reference vectors for each physical sensor may used to calculate a final, composite reference vector to be used by the physical sensor device 500. In another embodiment, only reference vectors associated with those checked vectors that are within a particular threshold with respect to the sensed vector will be used to calculate the composite reference vector. Accordingly, embodiments of the present disclosure may use multiple reference vectors to obtain a single composite reference vector that accounts for errors and illinearity. In this manner, a more precise estimation of the orientation of a physical sensor device may be obtained.

When an incoming sensed vector is read, it may be checked against each of the check vectors in order to determine which check vector the sensed vector is closest to. More than one reference vector or reference vector pair may be used in the calculation of the composite reference vector. For example, the reference vectors from the closest check vectors may influence the calculation of the composite reference vector more than those of check vectors that are farther away from the sensed vector. This disclosure will first cover details of such a system in general terms, and then will focus on design choices which were made for a specific implementation of this system.

Generation of a Reference Vector Table in a Multi-Reference Vector System

A specific implementation of a reference vector generation process according one embodiment will now be described. The reference vector table may be stored in the computer useable medium 255. Each entry of the reference vector table may be calculated when the physical sensor device is in a different reference orientation. There should also be an external source that can indicate which reference orientation the physical sensor device should actually be reading for each reference orientation. Examples of such an external source include, but are not limited to, a gimbal device and a human operator. Given the reference orientation and the physical sensor device's sensed orientation, the two elements (per physical sensor within the physical sensor device) which form an entry in the reference vector table may be calculated:

Given a reference vector table with n entries:

For $m \in \{1, \ldots n\}$ (the entry index), and $i \in \{1, 2\}$ (the physical sensor index in a two-sensor embodiment):

1) A check vector, $C_{m,i}$, which may be checked against sensed vectors in order to determine closeness to the sensed vector(s). This vector will point in the same direction as the sensed vector whenever the physical sensor device orientation matches the reference orientation. These check vectors $C_{m,i}$ are calculated by simply recording the current value of the sensed vectors at the reference orientation.

2) A reference vector, $R_{m,i}$ which is used in the calculation of the final composite reference vector. All reference vectors will point in roughly the same direction, as they mimic the function of the base reference vector. The calculation of a reference vector according to one embodiment is as follows:

(a) form a 3×3 matrix, M, the columns of which are, in order, the sensed vector from a first physical sensor, the sensed vector from a second physical sensor, and the cross product of the first sensed vector with the second sensed vector;

(b) convert the reference orientation into matrix form, called N;

(c) calculate $N^{-1}*M$, and call this matrix F; and (d) the reference vector set for the two sensors is the first two columns of this matrix.

Once the reference vector table has an entry calculated for every reference orientation, it may be used with in coming physical sensor readings to determine which pair of reference vectors to use, as such:

Given physical sensor readings $S_1$ and $S_2$, and the reference vector table with n entries:

(a) For $m \in \{1, \ldots n\}$, calculate how near each sensed vector is to the corresponding check vector $C_{m,i}$. This value is used as the basis for the weight that each reference vector will have in the calculation of the final composite vector. The calculation of how near each sensed vector is to the corresponding check vector may be performed by $w_m = (S_1 * C_{m,1})^p + (S_2 * C_{m,2})^p$, where p is a constant that affects how much of an affect the vector distance has on $w_m$, and may be determined experimentally. A good starting point may be p=1. When p>1, farther away vectors will contribute less to the final composite vector, and will contribute more for p<1.

(b) Further manipulation may be performed on each $w_m$ at this point. Each $w_m$ may be used to calculate how much of a contribution each reference vector makes in the final composite reference vector, so different forms of manipulation could produce different responses with regards to the relationship of check vector distances to reference vector contributions. As an example and not a limitation, $w_m$ should, after manipulation, be in the range 0 to 1. While the value should be near 0 when the vectors are far apart, it does not need to be near 1 when they are close, due to weight normalization. Accordingly, in some embodiments, it may make sense to raise each $w_m$ to a certain power based on whether it is desired to have its closeness to 0 to have a greater or lesser effect, much as was done with p in (a). A specific example is discussed below.

(c) Calculate the total weight by: $w_{total} = \sqrt{(\Sigma_{m=1}^{N} w_m^2)}$.

(d) If the total is found to be below a certain threshold (this may vary based on (b), but could be something like $10^{-5}$), the base reference vectors should be used and (e) and (f) below should be skipped. This prevents final composite reference vectors far from the reference vectors from being fabricated, thus preventing problems which might arise from using an interpolated, potentially incorrect final composite reference vector. Depending on how (b) was performed and how well the physical sensors react to interpolated reference vectors, the importance of (d) may vary.

(e) Calculate the final composite reference vector for each sensor from the reference vectors of each entry scaled by the normalized weight for that entry by:

$$ref_{final} = \Sigma_{m=1}^{N} R_{m,n} * w_m / w_{total}.$$

(f) Normalize the final composite reference vectors.

Exemplary Implementation

Figure 6:
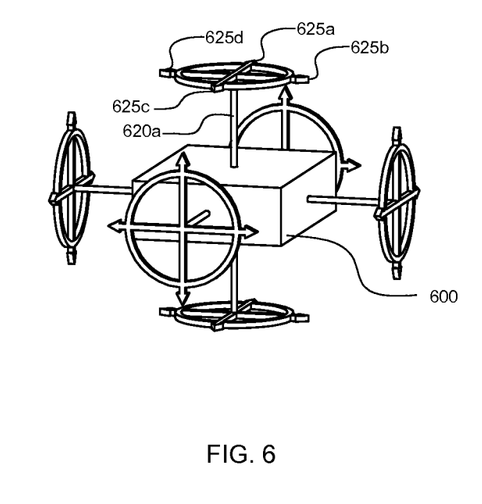
FIG. 6 schematically depicts a plurality of exemplary reference orientations of a physical sensor device according to one or more embodiments described and illustrated herein.

Referring now to FIG. 6, the exemplary implementation uses each orientation which can be arrived at by using multiples of 90 degrees as values for the Euler angles: yaw, pitch and roll (using the orientation defined by the base reference vectors as the zero orientation). There are six major directions 602 (only one of which is numbered for ease of illustration) in which the physical sensor device 600 can face, and four directions 625a-625d in which the top of the physical sensor device 600 can face when the physical sensor device 600 is facing one of the six major directions 602. This means that every orientation should leave all faces of the physical sensor device parallel to a plane in which one of the three components (x,y,z) is zero.

These orientations produce an even spread of orientations, ensuring all orientation gaps are the same size. These orientations also allow for easy reference orientation selection by a human operator. So long as the zero orientation of the physical sensor device 600 has been set such that it is aligned with the human operator's own personal x, y, and z axes, all of these rotations will cause the physical sensor device to appear to be lined up with the human operator's own personal x, y, and z axes. This makes it easy for the human to judge when the physical sensor device 600 is in the proper calibration position.

Furthermore, this assumption allows the physical sensor device 600 to use the nearest one of these 90 degree orientations to its own sensed orientation as its reference orientation. One method of performing this calculation is to form a list of all such 90 degree orientations, and to do something akin to the dot product between the sensed orientation and each of these twenty-four reference orientations, choosing the one with the highest value (the details of the dot product may differ depending on how the orientations are represented). Except for this change, the calculation proceeds as indicated above for the rest of the reference vector table entry calculation portion.

Another detail of this exemplary implementation is the way in which the entry weights ($w_m$) may be calculated. It should be understood that the entry weights may be calculated by any number of formulas or methodologies. In this exemplary implementation, process b), as listed above, was replaced by the following:

i) For m∈{1, ... n}, set $w_m = w_m/4$. The total range of the data before this process was −2 to 2, and it is desirable for the data to be in the range of −0.5 to 0.5.

ii) For m∈{1, ... n}, clamp $w_m$ such that $-0.5 \le w_m \le 0.5$. This ensures that no mathematical errors can push the value out of the desired range.

iii) For m∈{1, ... n}, add 0.5 to $w_m$, thereby placing the data in the range of 0 to 1.

iv) Set $w_{max}$ to be the largest of all $w_m$.

v) Set $t_{pow}$ to be $2 + w_{max} * 8$. This is a power multiplier that may be used to shrink all weights more if large weights (e.g., close to 1) are present.

vi) For m∈{1, ... n}, set $w_m$ to be $w_m^{8 * t_{pow}}$. This eliminates low-valued weights and leaves only those with larger values. It is noted that the power range used here is arbitrary.

The above-described methodology was obtained experimentally, and was chosen because it worked well, in terms of determining reference vector ratios. It should be understood that embodiments are not limited to the above-described methodology to calculate the entry weights.

Tare Orientation

Though base reference vectors may be used to set the zero orientation so that the sensed orientation readily relates to a human's natural axial frame, this may be more easily done with a tare orientation. A tare orientation is the use of a certain orientation for the zero orientation instead of the orientation indicated by the reference vectors. In a system that is using a tare orientation, it may be added to the above system by pre-multiplying the reference orientation by the tare orientation. The tare orientation may then be applied to the final orientation, calculated using the final composite reference vectors, by pre-multiplying the orientation by the inverse of this tare orientation. By using a tare orientation, the system designer is free to set the reference vectors to any values that work properly with the physical sensors without regard to which orientation they indicate.

Extending the Multi-Reference Vector System

There are improvements that can be made, particularly in the area of calculation speed. As described above, the system will check sensed vectors against all available check vectors to determine which reference vectors should be used in calculating the final composite reference vector. In an alternative embodiment, a system of cells may be developed which can be indexed in constant time based on the orientation described by the two sensed vectors. There are many ways to set up such a system of cells. For example, the first sensed vector could be decomposed into yaw and pitch, and the second sensed vector as a roll around the first sensed vector. Using these three numbers, a three dimensional lookup table may be created and utilized.

Figure 7A:
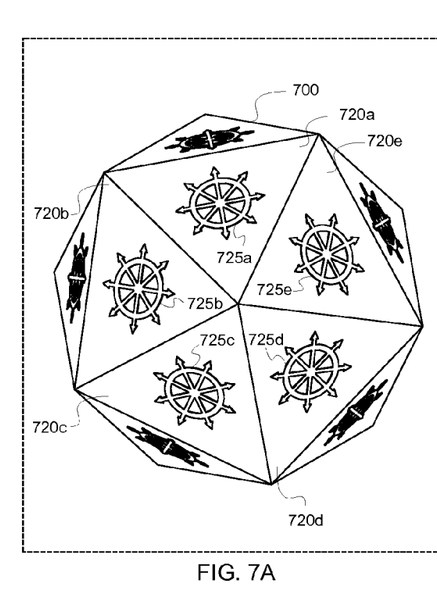
FIGS. 7A-7C schematically depict additional pluralities of exemplary reference orientations of a physical sensor device according to one or more embodiments described and illustrated herein.
Figure 7B:
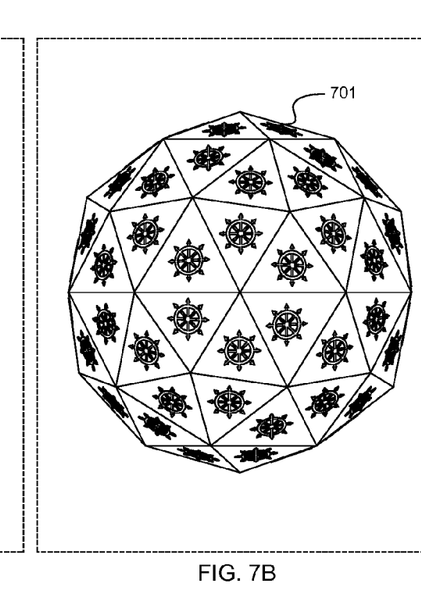
Figure 7C:
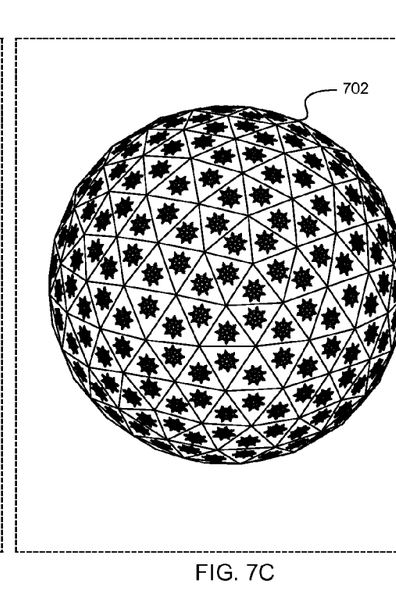

Other examples of potential cell table geometries are in FIGS. 7A-7C, with various levels of subdivision. Referring initially to FIG. 7A, a graphical representation of a physical sensor device 700 is depicted. It is noted that FIGS. 7A-7C do not represent the actual shape of a physical sensor device, but rather a graphical representation of many reference orientations that the physical sensor device 700 may be positioned to develop lookup tables during calibration. The physical sensor device 700 illustrated in FIG. 7A has twenty major directions that it is positioned in during calibration, whereas the physical sensor device 600 depicted in FIG. 6 has six major directions. The major directions are represented by surfaces 720a-720e. It should be understood that only surfaces 720a-720e are numbered for ease of illustration. For each major direction, the physical sensor device 700 may be positioned in six directions in which the "top" of the physical sensor device 600 can face when the physical sensor device 700 is facing one of the major directions, as illustrated by directional arrow sets 725a-725e corresponding to major directions illustrated by surfaces 720a-720e.

Each illustrated surface and individual directional arrows define a cell for which a lookup table may be established. Once a lookup table has been established, each cell may contain the check and reference vectors for each of the sensed vectors, as well as a table of indices of other nearby cells. In this manner, a lookup may lead directly to a list of all cells near the current estimated orientation, thereby significantly reducing the number of vectors which must be examined.

FIGS. 7B and 7C are similar to the embodiment depicted in FIG. 7A, except that the number of cells defined for the physical sensor devices 701 and 702 is increased. Any number of cells and corresponding lookup tables may be utilized depending on the degree of accuracy needed for the particular application. It is recommended that a gimbal device be used to calibrate the physical sensor device in the reference orientations represented by FIGS. 7A-7B.

It is to be understood that the preceding detailed description is intended to provide an overview or framework for understanding the nature and character of the subject matter as it is claimed. It will be apparent to those skilled in the art that various modifications and variations can be made to the embodiments described herein without departing from the spirit and scope of the present disclosure. Thus, it is intended that the claimed subject matter cover the modifications and variations of this disclosure provided they come within the scope of the appended claims and their equivalents.

It is noted that terms like "commonly," when utilized herein, are not intended to limit the scope of the claimed subject matter or to imply that certain features are critical, essential, or even important to the structure or function of the claimed subject matter. Rather, these terms are merely intended to highlight alternative or additional features that may or may not be utilized in a particular embodiment.

What is claimed is:

1. A method of estimating an orientation of a physical sensor device, the method comprising:
   determining at least one sensed vector associated with at least one physical sensor;
   comparing, by a controller, the at least one sensed vector to at least a portion of a plurality of check vectors, wherein:
      each check vector of the plurality of check vectors corresponds to an orientation of the physical sensor device; and
      a reference vector is associated with each check vector, defining a plurality of reference vectors;
   selecting at least one check vector that is closest to the at least one sensed vector;
   selecting at least one reference vector associated with the selected at least one check vector; and
   estimating the orientation of the physical sensor device based at least in part on the selected at least one reference vector.

2. The method of claim 1, wherein the plurality of check vectors are determined by a calibration process.

3. The method of claim 2, wherein the calibration process comprises, for a plurality of reference orientations:
   orientating the physical sensor device into a selected reference orientation;
   determining at least one sensed vector;
   recording the check vector based at least in part on the at least one sensed vector; and
   calculating a reference vector associated with the recorded check vector.

4. The method of claim 2, wherein the at least one sensed vector comprises a first sensed vector associated with a first physical sensor and a second sensed vector associated with a second physical sensor.

5. The method of claim 4, wherein the calibration process comprises, for a plurality of reference orientations:
   orientating the physical sensor device into a selected reference orientation;
   determining the first sensed vector and the second sensed vector;
   recording a first check vector based at least in part on the first sensed vector, and recording a second check vector based at least in part on the second sensed vector; and
   calculating a first reference vector associated with the first check vector, and calculating a second reference vector associated with the second check vector.

6. The method of claim 5, wherein:
   the selected at least one check vector comprises the first check vector obtained from the first physical sensor and the second check vector obtained from the second physical sensor; and
   the selected at least one reference vector is based on the first reference vector associated with the first check vector and the second reference vector associated with the second check vector.

7. The method of claim 1, wherein:
   the at least one physical sensor comprises a first physical sensor and a second physical sensor;
   the at least one sensed vector comprises a first sensed vector associated with the first physical sensor and a second sensed vector associated with the second physical sensor;
   the plurality of check vectors comprise a plurality of check vector pairs comprising a first check vector obtained from the first physical sensor and a second check vector obtained from the second physical sensor; and
   each check vector pair of the plurality of check vector pairs is associated with a reference vector pair comprising a first reference vector associated with the first check vector and a second reference vector associated with the second check vector.

8. The method of claim 7, further comprising:
   comparing the first sensed vector to the first check vector of the plurality of check vector pairs;
   comparing the second sensed vector to the second check vector of the plurality of check vector pairs; and
   calculating one or more final reference vectors by applying a weight to one or more first reference vectors and to one or more second reference vectors based on a closeness of the first sensed vector to the first check vector associated with the one or more first reference vectors and a closeness of the second sensed vector to the second check vectors associated with the one or more second reference vectors.

9. A physical sensor device comprising:
   a first physical sensor configured to provide a first sensed vector corresponding to an orientation of the physical sensor device;
   a second physical sensor configured to provide a second sensed vector corresponding to the orientation of the physical sensor device;
   a controller operable to receive the first sensed vector and the second sensed vector; and
   a computer useable medium storing a reference vector table comprising a plurality of check vector pairs and a corresponding plurality of reference vector pairs, and computer readable code instructions that, when executed by the controller, causes the controller to:
      receive a sensed vector pair comprising the first sensed vector and the second sensed vector;
      compare the sensed vector pair to at least a portion of the plurality of check vector pairs, wherein each check vector pair corresponds to an orientation of the physical sensor device, and each check vector pair is associated with a reference vector pair;
      select at least one check vector pair that is closest to the sensed vector pair;
      determine a final reference vector based at least in part on at least one reference vector pair associated with the at least one check vector pair; and
      estimate the orientation of the physical sensor device based at least in part on the final reference vector.

10. The physical sensor device of claim 9, wherein the plurality of check vector pairs are determined by a calibration process.

11. The physical sensor device of claim 10, wherein the calibration process comprises, for a plurality of reference orientations:
   orientating the physical sensor device into a selected reference orientation;
   determining the first sensed vector and the second sensed vector;
   recording a first check vector based at least in part on the first sensed vector, and recording a second check vector based at least in part on the second sensed vector; and
   calculating a first reference vector associated with the first check vector, and calculating a second reference vector associated with the second check vector.

12. The physical sensor device of claim 9, wherein:
   each check vector pair of the plurality of check vector pairs comprises a first check vector obtained from the first physical sensor and a second check vector obtained from the second physical sensor; and
   each reference vector pair comprises a first reference vector associated with the first check vector and a second reference vector associated with the second check vector.

13. The physical sensor device of claim 12, further comprising:
   comparing the first sensed vector to the first check vector of the plurality of check vector pairs;
   comparing the second sensed vector to the second check vector of the plurality of check vector pairs; and
   calculating one or more final reference vectors by applying a weight to one or more first reference vectors and to one or more second reference vectors based on a closeness of the first sensed vector to the first check vector associated with the one or more first reference vectors and a closeness of the second sensed vector to the second check vectors associated with the one or more second reference vectors.

14. The physical sensor device of claim 9, wherein the final reference vector is based at least in part on two or more weighted reference vector pairs.

15. The physical sensor device of claim 14, wherein the reference vector pairs associated with check vector pairs that are closer to the sensed vector pair are weighted greater than the reference vector pairs associated with check vector pairs that are further from the sensed vector pair.

16. A computer useable medium and computer readable code embodied on the computer useable medium for estimating an orientation of a physical sensor device, the computer readable code comprising:
   computer readable code instructions configured to cause a controller to effect the determining of at least one sensed vector associated with at least one physical sensor;
   computer readable code instructions configured to cause the controller to effect the comparing of the at least one sensed vector to at least a portion of a plurality of check vectors, wherein:
      each check vector of the plurality of check vectors corresponds to an orientation of the physical sensor device; and
      a reference vector is associated with each check vector, defining a plurality of reference vectors;
   computer readable code instructions configured to cause the controller to effect the selecting of at least one check vector that is closest to the at least one sensed vector;
   computer readable code instructions configured to cause the controller to effect the selecting of a selected at least one reference vector associated with the selected at least one check vector; and
   computer readable code instructions configured to cause the controller to effect the estimating the orientation of the physical sensor device based at least in part on the selected at least one reference vector.

17. The computer useable medium of claim 16, wherein the at least one sensed vector comprises a first sensed vector associated with a first physical sensor and a second sensed vector associated with a second physical sensor.

18. The computer useable medium of claim 17, wherein:
   the selected at least one check vector comprises a first check vector obtained from the first physical sensor and a second check vector obtained from the second physical sensor; and
   the selected at least one reference vector is based on a first reference vector associated with the first check vector and a second reference vector associated with the second check vector.

* * * * *